United States Patent
Chen et al.

(10) Patent No.: US 7,788,987 B2
(45) Date of Patent: Sep. 7, 2010

(54) SELF-LUBRICATING BALL SCREW

(75) Inventors: Yan-yu Chen, Taichung (TW); Chung-Hsueh Lin, Taichung (TW)

(73) Assignee: Hiwin Technologies Corp., Taichung (TW)

( * ) Notice: Subject to any disclaimer, the term of this patent is extended or adjusted under 35 U.S.C. 154(b) by 926 days.

(21) Appl. No.: 11/277,794

(22) Filed: Mar. 29, 2006

(65) Prior Publication Data
US 2007/0227281 A1 Oct. 4, 2007

(51) Int. Cl.
F16H 3/06 (2006.01)

(52) U.S. Cl. ...................................... 74/89.44

(58) Field of Classification Search ................ 74/89.44, 74/89.23–89.3, 89.31, 89.34, 424.71–424.81; 384/13
See application file for complete search history.

(56) References Cited

U.S. PATENT DOCUMENTS 6,364,058 B1 * 4/2002 Nishide et al. ................ 184/5
6,619,148 B2 * 9/2003 Nishide ...................... 74/89.44
2005/0201644 A1 * 9/2005 Lee et al. ...................... 384/13
2006/0169075 A1 * 8/2006 Chuo ......................... 74/89.44

FOREIGN PATENT DOCUMENTS

TW 245858 * 12/2005

* cited by examiner

Primary Examiner—Thomas R Hannon
Assistant Examiner—James Pilkington
(74) Attorney, Agent, or Firm—Banger Shia

(57) ABSTRACT

A self-lubricating ball screw comprises a nut, a screw shaft, at least one lubricating unit and at least one external oil tank. The lubricating unit is disposed in the nut, an end of the lubricating unit protrudes out of the nut and contacts the screw shaft, and another end of the lubricating unit is connected to the oil tank for absorbing the lubricating oil to the lubricating unit from the oil tank. An opening is formed in a side of the respective oil tanks, allowing for radial movement of the screw shaft. With the opening, the oil tank can be replaced at any time. The lubricating unit straddles the wipers and transmits lubricating oil to the protrusion without affecting the original arrangement of the wiper at either end of the nut, thus effectively saving the space of the oil tank, simplifying the structure and improving the maintenance efficiency.

2 Claims, 6 Drawing Sheets

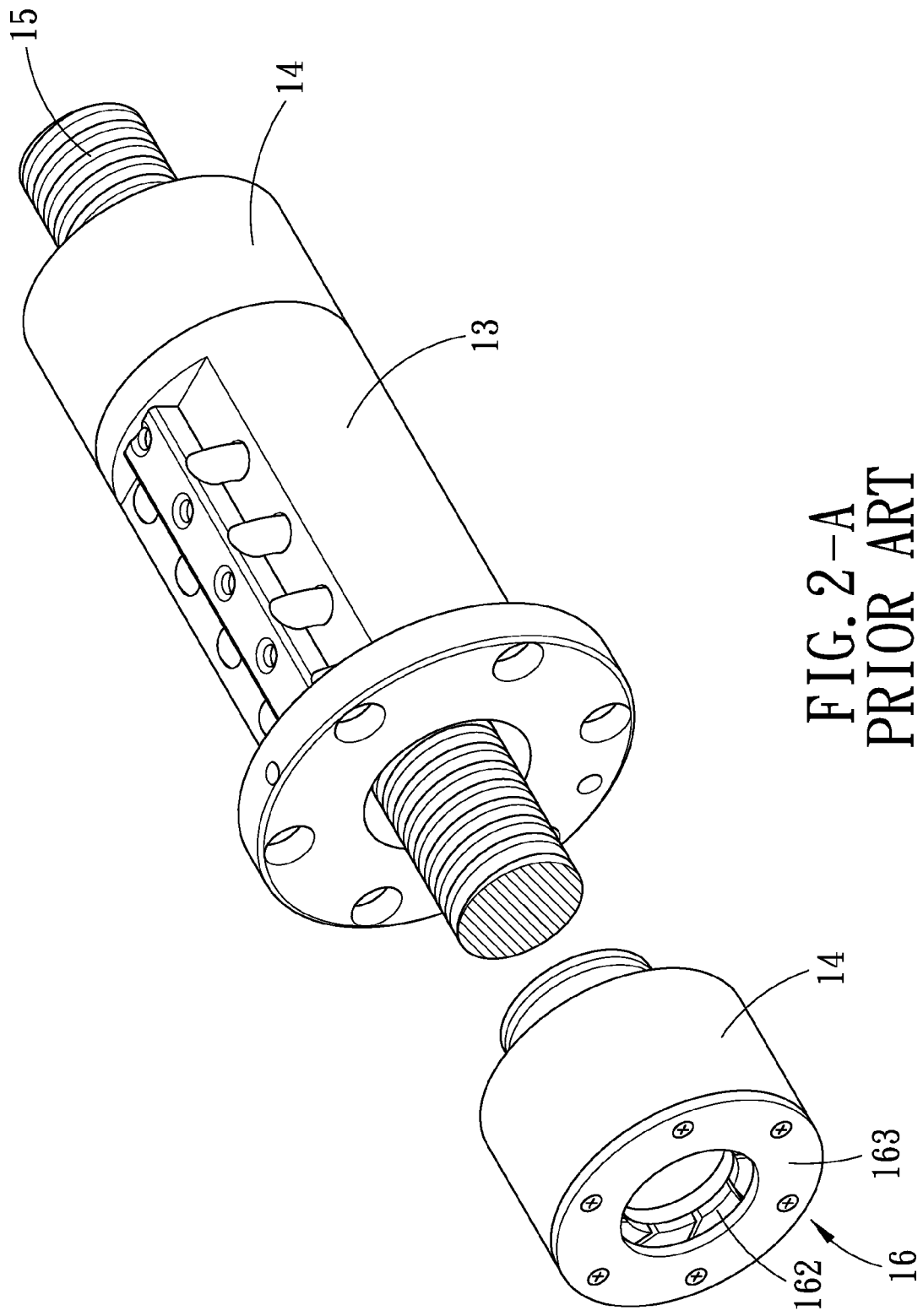
FIG.2-A
PRIOR ART

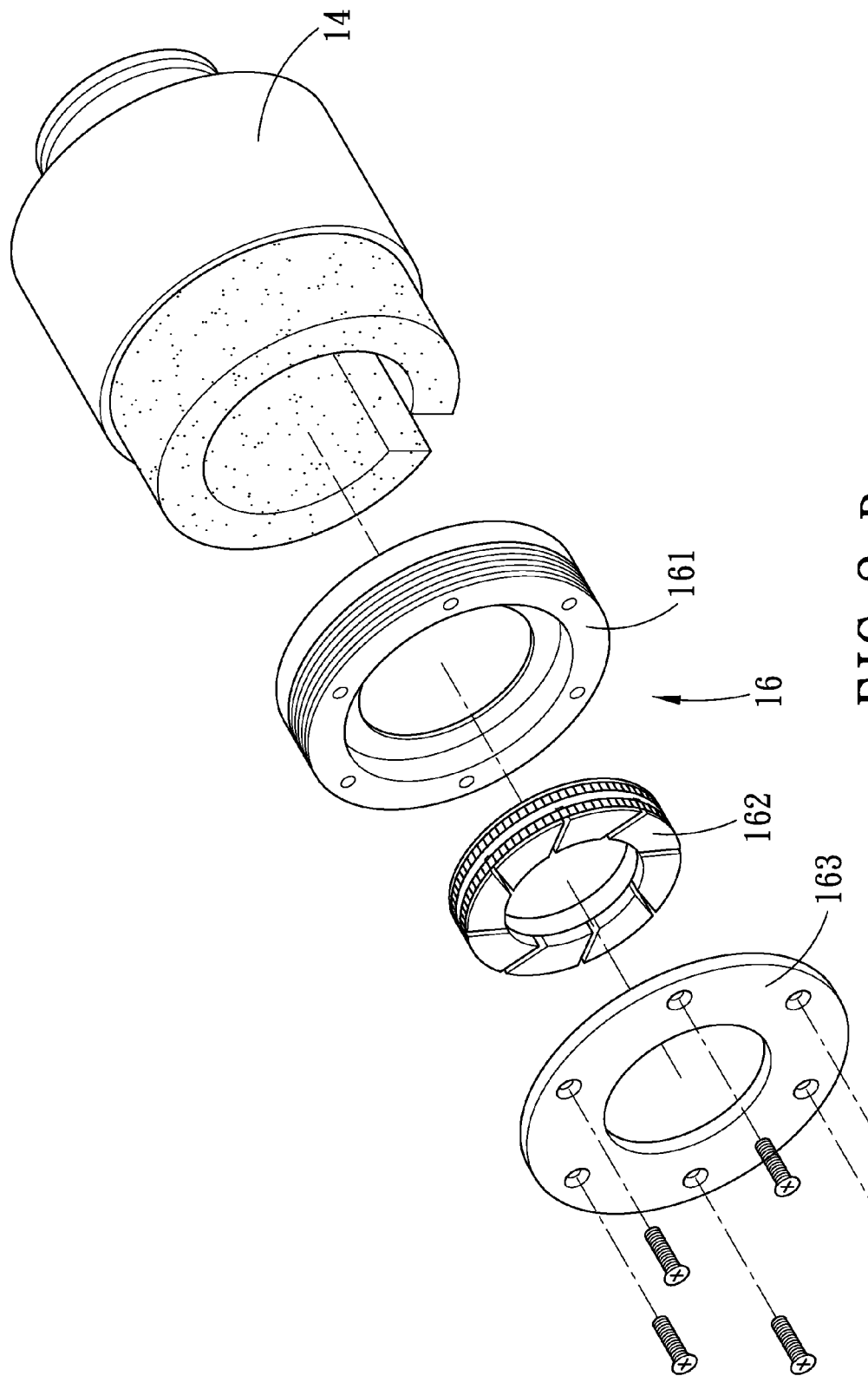
FIG.2-B
PRIOR ART

SELF-LUBRICATING BALL SCREW

FIELD OF THE INVENTION

The present invention relates to a ball screw, and more particular to a self-lubricating ball screw, wherein the oil tank is replaceable at any time, and the lubricating unit doesn't affect the original arrangement of the wiper at either end of the nut, thus effectively saving the space of the oil tank, simplifying the structure and improving the maintenance efficiency.

DESCRIPTION OF THE PRIOR ART

Since linear transmission products are being applied more and more widely in the modern industry, various linear transmission mechanisms have widely come into human life, manufacturing factory and high science and technology instruments, such as linear guideway, ball screw, and the like. Particularly in a large-scale precision mechanism are usually installed various large and small ball screws or linear guideway systems. Although the technology for linear transmission element is developing fast, consumers still need the technology to be improved uninterruptedly. Therefore, there are still some problems to be solved. And this desire for constant improvement of technology is particular strong in many high precision mechanism-manufacturing fields that require comparative stability and quiet. Hence, the existing linear mechanism still has some technological blind spots to be improved.

A conventional ball screw lubricating system is shown in FIG. 1, wherein a nut 11 is screwed on the screw shaft 10, and a wiper 111 is disposed at either side of the nut 11. Two external oil tanks 12 are screwed on the screw shaft 10 and located at either side of the nut 11. Each of the oil tanks 12 contains an oil-containing member 121 that contacts the screw shaft 10 for the purpose of lubrication. However, the abovementioned ball screw is impractical because of the following reasons:

First, due to the nut 11 is provided at either side thereof with the wiper 111, and the two oil tanks 12 are located outside the nut 11, one can imagine that most of the oil that the oil-containing member 121 smears on the screw shaft 10 will be wiped off by the wipers 111. As a result, the screw shaft cannot be lubricated effectively, and the lubricating oil will be wasted.

Second, in real use, the rotation of the screw shaft 10 will consume the oil in oil tanks 12. When the oil is used up, the user has to disassemble the screw shaft 10 from the ball screw, and then the oil tanks 12 can be replaced. Furthermore, the ball screw must be rectified again. It is not only time consuming but also laborsome.

Hence, with the popularization of the linear transmission application, the demand of solving the aforementioned problems is becoming more and more urgent, and manufacturing an easily maintained ball screw less with a good lubricating effect has become the most important selling point that the manufactures are striving for. Therefore, how to develop a linear transmission element more satisfying the user's needs has become a focal point in the linear transmission unit manufacturing field.

What follows is an example of the improved technology of an existing product disclosed in a US patent:

FIG. 2-A shows the product disclosed in U.S. Pat. No. 6,364,058 B1, wherein a nut 13 and an oil tank 14 are screwed on the screw shaft 15, and a wiper 16 is fixed at a terminal end of the oil tank 14. The wiper 16 comprises a sealing case 161, a wiper ring 162 and a cover 163 (as shown in FIG. 2-B), the wiper 16 is located at the outermost edge of the nut so as to prevent the lubricating oil from being unexpectedly stopped out of the nut. However, this ball screw system is not only complicated in structure, difficult to assemble, because the nut 13, the two oil tanks 14 and the wipers 16 should be screwed on the screw shaft, respectively, but also the wiper 16 has many components and its cost is high.

The present invention has arisen to mitigate and/or obviate the afore-described disadvantages.

SUMMARY OF THE INVENTION

The primary objective of the present invention is to a self-lubricating ball screw that doesn't affect the original arrangement of the wiper at either end of the nut, and can provide a good lubricating effect.

To achieve the abovementioned objective, the lubricating unit is disposed in the nut in such a manner that the external oil tanks are fixed to both ends of the nut, and an end of the lubricating unit protrudes out of the nut and contacts the screw shaft, and another end of the lubricating unit is connected to the oil tank for absorbing lubricating oil. In this way, the lubricating unit will not affect the original arrangement of the wiper at either end of the nut and can prevent the wiper from wiping off the lubricating oil, thus effectively saving the space of the oil tank, simplifying the structure and reducing the assembly cost.

The secondary objective of the present invention is to a simply structured and easily assembled self-lubricating ball screw.

The present invention is provided with an external oil tank, a side of the oil tank is formed with an opening that allows for passage of the screw shaft, and an end of the oil tank is inserted in the nut. The opening allows for quick replacement of the oil tank, thus simplifying the lubricating structure while improving the assembly efficiency.

The present invention will become more obvious from the following description when taken in connection with the accompanying drawings, which show, for purpose of illustrations only, the preferred embodiments in accordance with the present invention.

BRIEF DESCRIPTION OF THE DRAWINGS

FIG. 2-A is an exploded view of another conventional lubricating structure of a ball screw;

FIG. 2-B is an exploded view of another conventional lubricating structure of a ball screw;

DETAILED DESCRIPTION OF THE PREFERRED EMBODIMENTS

Figure 1:
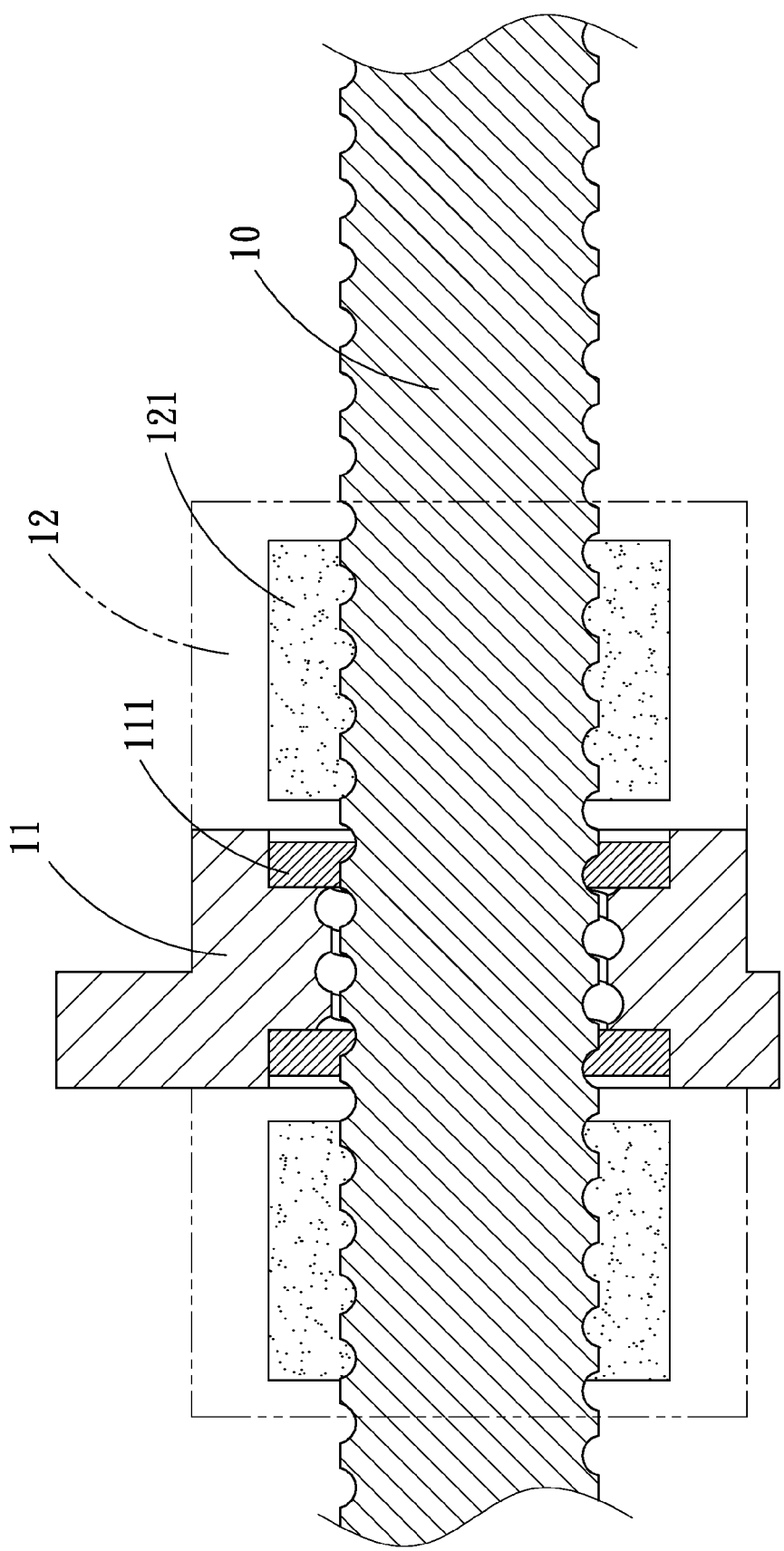
FIG. 1 is a cross sectional view of a conventional lubricating structure of a ball screw.
Figure 3:
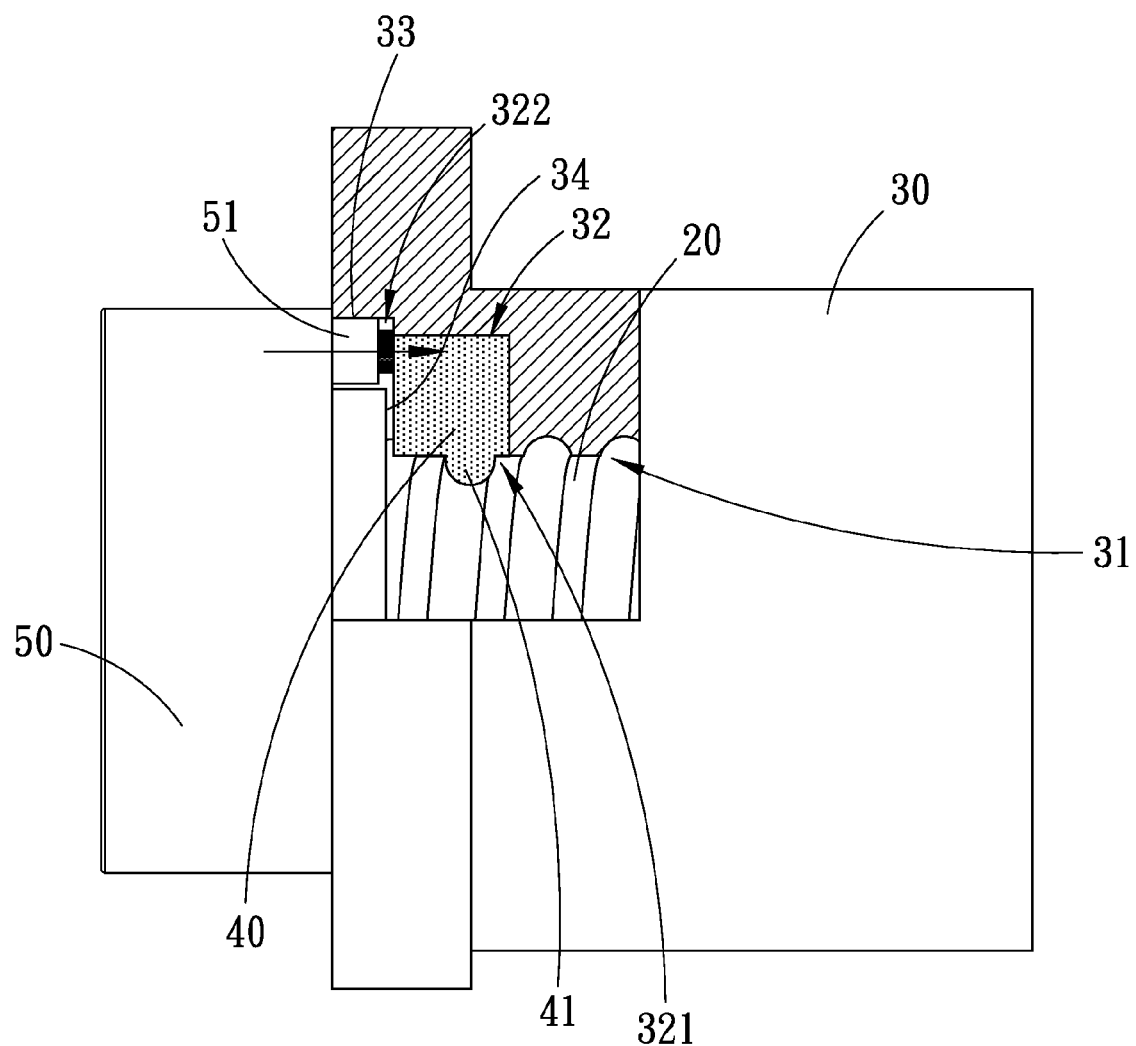
FIG. 3 is an assembly cross sectional view of a first embodiment of the present invention.
Figure 4:
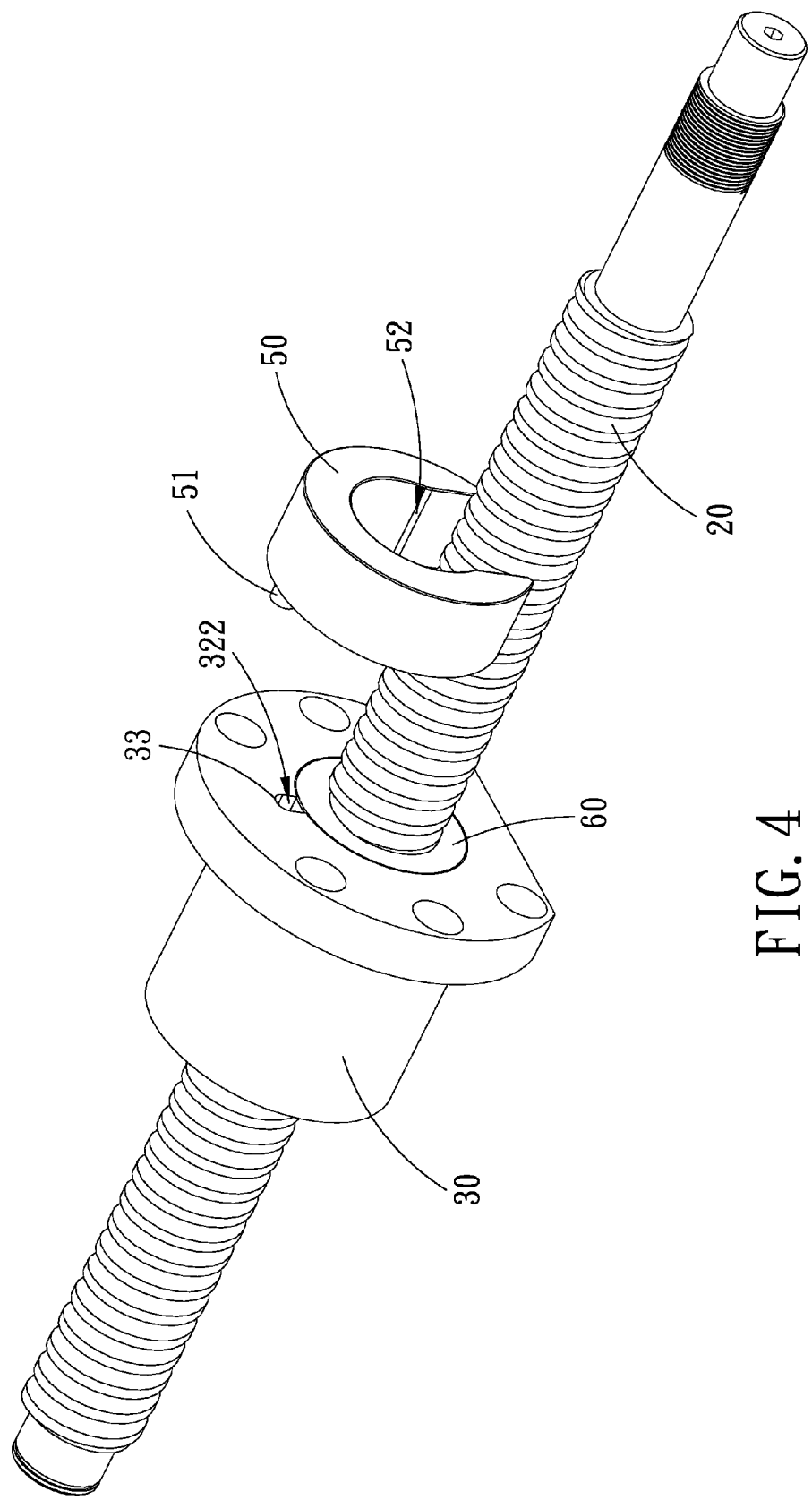
FIG. 4 is an exploded view of showing an oil tank in accordance with the first embodiment of the present invention.
Figure 5:
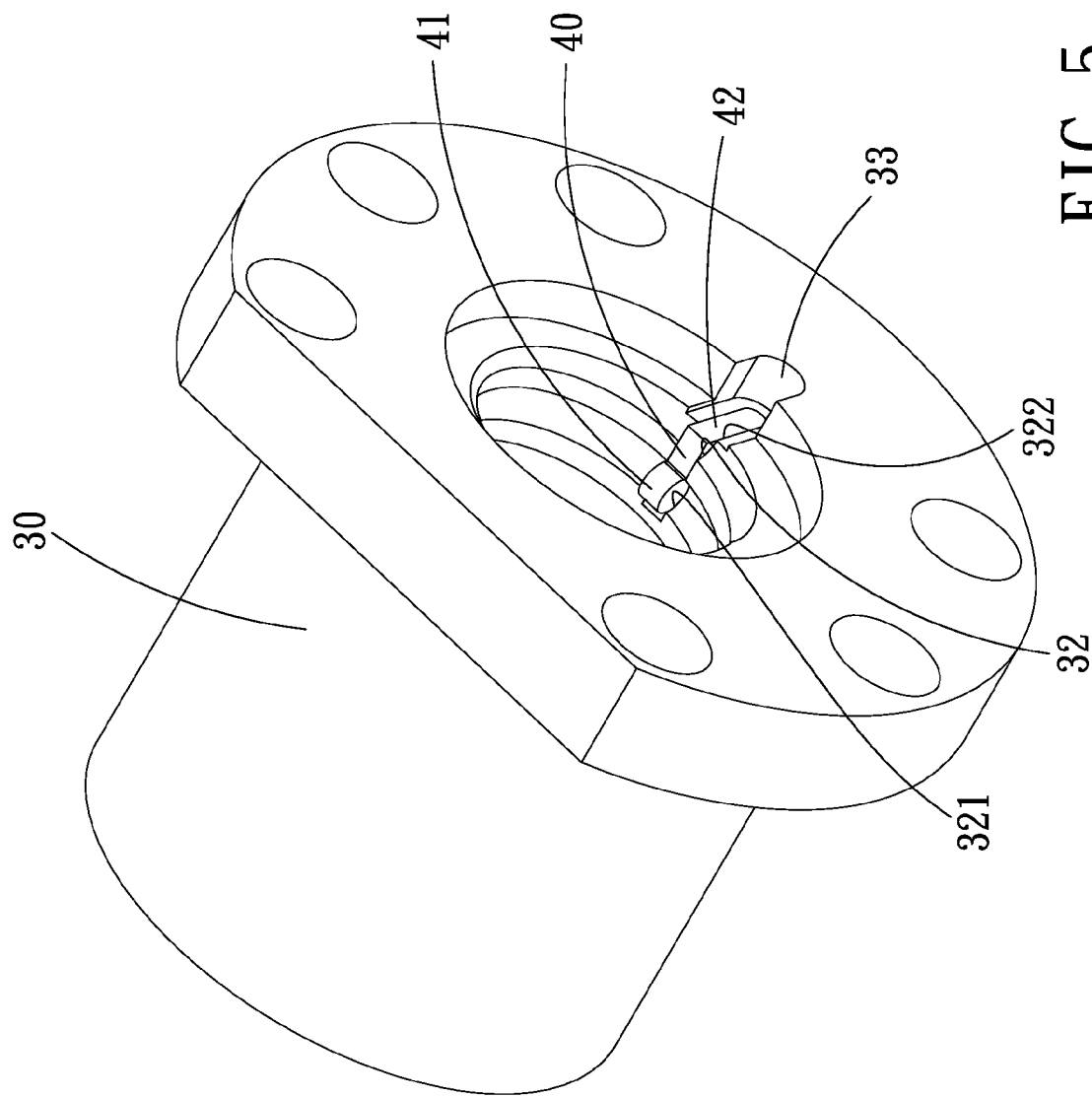
FIG. 5 is a perspective view of the nut and the lubricating unit in accordance with the first embodiment of the present invention.

The foregoing, and additional objects, features and advantages of the present invention will become apparent from the following detailed description of preferred embodiments thereof, taken in conjunction with the accompanying FIGS. 3-5.

A self-lubricating ball screw in accordance with the present invention comprises a screw shaft 20, a nut 30, two lubricating units 40 and two external oil tanks 50. The screw shaft 20 is screwed in a threaded hole 31 of the nut 30.

The two external oil tanks 50 are fixed to both ends of the nut 30.

The present invention is characterized in that: the nut 30 is defined with a receiving space 32 in which are disposed the lubricating units 40, each of the lubricating units 40 is formed with a protrusion 41 used to contact the screw shaft 20 and an absorbing portion 42 used to contact the oil tanks 50.

The nut 30 is defined with the receiving space 32, in an end of the receiving space 32 is a hole 321 for insertion of the screw shaft 20, and in another end of the receiving space 32 is an absorbing hole 322 (in the axial direction of the nut 20) formed in the sidewall of the nut 30. A positioning groove 33 is formed in the nut 30 and located adjacent the absorbing hole 322, and in the end of the nut 30 is further defined a recess 34 for wiper. The hole 321 of the receiving space 32 is located more inside the nut 30 as compared with the recess 34.

The lubricating units 40 are engaged in the receiving space 32 of the nut 30, an end of the respective lubricating units 40 is formed with the protrusion 41 that protrudes out of the hole 321 of the receiving space 32 for mating with the screw shaft 20. The lubricating units 40 each have the absorbing portion 42 received in the absorbing hole 322 of the receiving space 32.

The oil tanks 50 are filled with lubricating oil and fixed at both ends of the nut 30. Each of the oil tanks 50 is formed with a protruding head 51 positioned in the positioning groove 33 adjacent to the absorbing hole 322 of the nut 30 for outputting lubricating oil. The protruding head 51 abuts against the absorbing portion 42 of the lubricating units 40. An opening 52 in a side of the respective oil tanks 50 is formed correspondingly to the shape of the screw shaft 20 (the oil tank 50 is formed in the shape of a horseshoe), and the opening 52 allows for radial movement of the screw shaft 20.

Two wipers 60 are engaged in the recess 34 at the end of the nut 30.

The receiving space 32 can be an elongated groove with one end open, or a concealed groove partially embedded in the nut 30, or in any other forms as long as it can receive the lubricating units 40.

For a better understanding of the first embodiment, its operation and function, reference should be made then to FIGS. 3 and 4.

Since the opening 52 is formed in the side of the respective oil tanks 50, and the opening 52 allows for radial movement of the screw shaft 20, such arrangements allow for easy replacement of the oil tanks 50. The user only needs to pull the protruding head 51 of the oil tanks 50 out of the positioning groove 33 of the nut 30, then pull the oil tanks 50 upward, the opening 52 will disengage the screw shaft 20, and the oil tanks 50 can be disassembled and replaced easily. On the other hand, the oil tanks 50 also can be assembled easily in reverse order to the steps described above.

In addition, the wipers 60 are positioned in the recess 34 at the end of the nut 30, the hole 321 of the receiving space 32 is located more inside the nut 30 as compared with the recess 34, plus the protrusion 41 protrudes out of the hole 321 of the receiving space 32 and contacts the screw shaft 20, the oil tanks 50 can use the protruding head 51 to output lubricating oil to the lubricating units 40, and the lubricating units 40 straddle the wipers 60 and transmit lubricating oil to the protrusion 41. The external oil tanks 50 have quick-release function, the nut 30 and the wiper 60 also can be simply structured, and the wipers 60 will not wipe the lubricating oil off the screw shaft.

The main characteristic of the present invention is that the oil tank can be replaced easily at any time. When the oil tank is fixed at the end of the nut, lubricating oil will be transmitted from the oil tank to the lubricating unit in the nut and then will be applied to the screw shaft, automatically.

In addition, the abovementioned receiving space can be formed by the ineffective helical groove in the nut, wherein no balls pass through the ineffective helical groove. Since the ineffective helical groove of the nut also mates with the effective helical groove of the screw shaft, the receiving space can be defined in the ineffective helical groove of the nut for receiving a lubricating unit that can lubricate the effective helical groove of the screw shaft directly.

To summarize, the improved structure of the present invention comprises a nut, a screw shaft, at least one lubricating unit and at least one external oil tank. The lubricating unit is disposed in the nut, an end of the lubricating unit protrudes out of the nut and contacts the screw shaft, and another end of the lubricating unit is connected to the oil tank for absorbing the lubricating oil to the lubricating unit from the oil tank. An opening is formed in a side of the respective oil tanks, allowing for radial movement of the screw shaft. With the opening, the oil tank can be replaced at any time. The lubricating unit straddles the wipers and transmits lubricating oil to the protrusion without affecting the original arrangement of the wiper at either end of the nut, thus effectively saving the space of the oil tank, simplifying the structure and improving the maintenance efficiency.

While we have shown and described various embodiments in accordance with the present invention, it should be clear to those skilled in the art that further embodiments may be made without departing from the scope of the present invention.

What is claimed is:

1. A self-lubricating ball screw comprising a screw shaft, a nut screwed on the screw shaft, and at least one oil tank detachably mounted on the screw shaft in a suspended manner and fixed to one end of the nut; characterized in that:
   the oil tank which is independent from the nut is provided with a protruding head fixed to the end of the nut and is provided with a horseshoe-shaped opening for allowing the oil tank to ride on the screw shaft in a suspended manner and to be removed from the screw shaft in a radial direction with respect to the screw shaft;
   the nut is defined with a receiving space in which is disposed a lubricating unit;
   the lubricating unit is formed with a protrusion and an absorbing portion, the protrusion of the lubricating unit maintains contact with the screw shaft, when the oil tank is installed on the nut, the absorbing portion will contact the oil tank to transmit oil from the oil tank to the lubricating unit.

2. The self-lubricating ball screw as claimed in claim 1, wherein a wiper is fixed to the end of the nut, and the oil tank will disengage from the wiper when it disengages from the nut.

* * * * *